Patented June 10, 1930

1,762,982

UNITED STATES PATENT OFFICE

ALEXANDER HASSELBACH AND FRITZ LUTHER, OF DESSAU, GERMANY, ASSIGNORS TO G. POLYSIUS, A FIRM OF DESSAU, GERMANY.

APPARATUS FOR BURNING COAL DUST

Application filed March 23, 1927, Serial No. 177,530, and in Germany December 18, 1926.

This invention relates to the burning of coal dust, or other finely sub-divided solid fuel and is particularly applicable for use with rotary kilns or the like which are employed for burning, roasting or clinkering cement or similar material.

Coal dust and other finely sub-divided solid fuel contains considerable quantities of volatile matter and when delivered through an ordinary nozzle consisting of a simple tube, the solid fuel or the volatile portion thereof often ignites and burns within the nozzle, if the latter be heated. This is objectionable and occurs particularly with rotary kilns for burning material of all kinds, where the nozzle projects into the kiln and the burned material radiates intense heat to the nozzle.

This is avoided by the present invention. In carrying out the invention, one part of the combustion supporting air is used for delivering the coal dust through the nozzle and another part of the combustion supporting air is delivered through an exterior pipe comprising a closed cooling jacket around the coal dust nozzle so as to protect the latter from the high heat in the kiln.

As a further feature of the invention, the admission nozzle is preferably formed of sections adapted to telescope so as to permit adjustment of the nozzle in a longitudinal direction whereby the desired heating or burning may best be accomplished in the kiln.

In the accompanying drawing, there are illustrated merely as examples two forms of apparatus embodying the invention and which may be used for carrying out the process.

Figure 1:
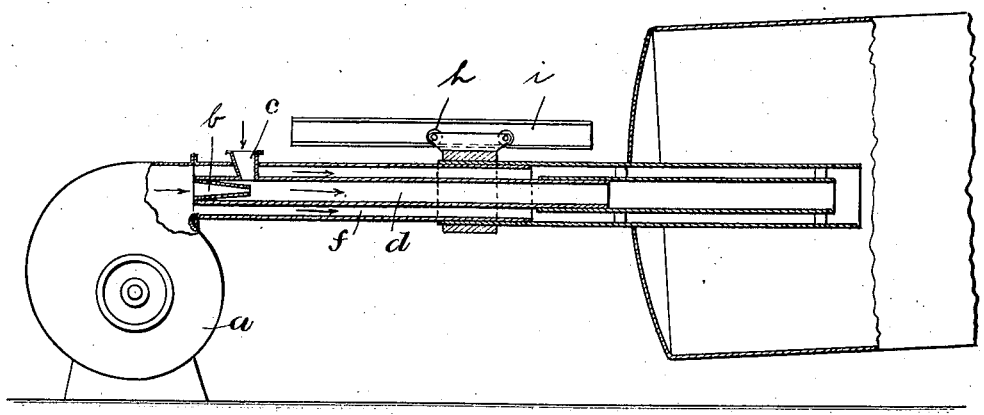
Figure 2:
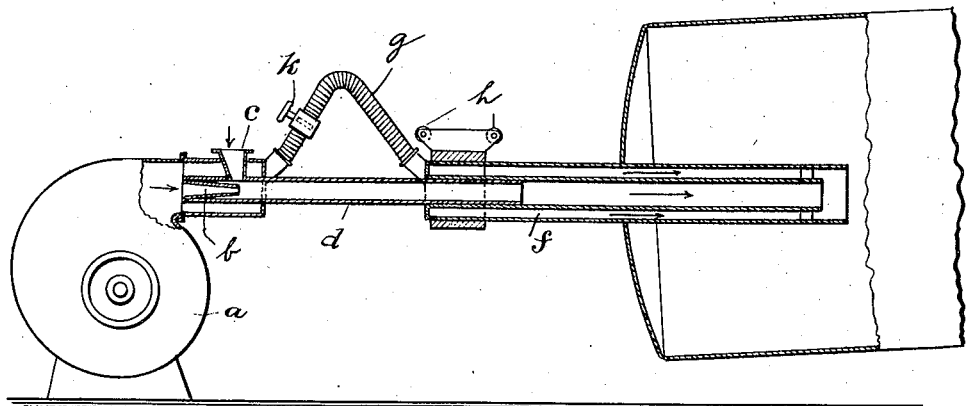

In these drawings:

Fig. 1 is a longitudinal section through one form of nozzle and the cooperating parts; and Fig. 2 is a similar section showing another form.

In Fig. 1 a blower $a$ delivers a part of the combustion supporting air through an air nozzle $b$ into the coal dust nozzle or admission pipe $d$. The coal dust is admitted to the pipe $d$ at a point adjacent to the air nozzle $b$ as for instance, through a pipe $c$. The coal dust is delivered into the kiln from the free end of the pipe $d$ and there is burned. Ordinarily the pipe projects some distance into the kiln and the latter is mounted for rotation.

Around the dust admission pipe $d$ there is placed a second pipe $f$ which is also connected to the outlet of the blower around the air nozzle $b$ so that it also receives air from the blower. The pipe $f$ extends lengthwise of an encloses the pipe $d$ and terminates within the kiln adjacent to the end of the pipe $d$ so that the air delivered through the outer pipe cools and protects the inner pipe and prevents the fuel from catching fire within the inner pipe. The amount of air delivered through the pipe $d$ is insufficient for supporting complete combustion and thus the air delivered from the outer pipe serves for not only cooling the inner pipe, but for the additional air required for complete combustion.

In order to permit an adjustment or a removal of the dust nozzle and delivery pipe, in a longitudinal direction, the pipes $d$ and $f$ may each be made of two or more telescoping sections. The sections of the pipes which project into the kiln may be guided or supported independently of the other sections of the pipes in any suitable manner as for instance by rollers $h$ mounted on one or more rails $i$.

It is not necessary that the sections of the outer pipe telescope as these sections may be connected by means of a hose $g$, as shown in Fig. 2, or by any other equivalent mechanism. Means may be provided for regulating the relative amounts of air delivered through the inner and outer pipes. I have shown such a regulating device in the form of a valve $k$ in the hose.

Having thus described our invention, what we claim as new and desire to secure by Letters Patent is:

1. In combination a combustion chamber, a blower, a pair of concentric pipes having their respective inlet ends connected to the outlet of the blower and their outlet ends projecting into said chamber, an injector nozzle in the inner pipe at the blower outlet, and means for delivering solid fuel in finely subdivided condition to the delivery end of said nozzle, whereby a mixture of air and fuel is delivered to the combustion chamber through the inner pipe, and the air delivered through the outer pipe serves to protect said mixture from the heat of said combustion chamber while said mixture is in transit in the inner pipe, and also serves to furnish the additional air required for combustion of the fuel upon the delivery of the mixture to the chamber.

2. In combination a combustion chamber, a rotary blower having an outlet, a pair of concentric pipes connected to said outlet, the inner of said pipes having an injector nozzle at the inlet end thereof, a pipe for delivering solid fuel in finely subdivided condition radially through the outer pipe into the inner pipe at a point adjacent to the end of said nozzle, means for regulating the supply of air delivered through the outer pipe, and means for adjusting said pipes simultaneously axially in respect to the combustion chamber.

Signed at Leipzig, Germany, this twenty-fifth day of February, 1927.

ALEXANDER HASSELBACH.
FRITZ LUTHER.